US011809001B2

(12) United States Patent
Rokach et al.

(10) Patent No.: US 11,809,001 B2
(45) Date of Patent: Nov. 7, 2023

(54) NETWORK INTERFACE DEVICE WITH EXTERNAL OPTICAL CONNECTOR

(71) Applicant: Mellanox Technologies Ltd., Yokneam (IL)

(72) Inventors: Alon Rokach, Yokneam (IL); Nimer Hazin, Yokneam (IL); Amit Oren, Yokneam (IL); Michael Greenman, Yokneam (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 0 days.

(21) Appl. No.: 17/715,136

(22) Filed: Apr. 7, 2022

(65) Prior Publication Data

US 2023/0324635 A1    Oct. 12, 2023

(51) Int. Cl.
*H04B 10/00* (2013.01)
*G02B 6/42* (2006.01)
*H01R 13/717* (2006.01)

(52) U.S. Cl.
CPC ............ *G02B 6/426* (2013.01); *G02B 6/428* (2013.01); *G02B 6/4251* (2013.01); *H01R 13/7172* (2013.01)

(58) Field of Classification Search
CPC ...... G02B 6/426; G02B 6/4251; G02B 6/428; H01R 13/7172
See application file for complete search history.

(56) References Cited

U.S. PATENT DOCUMENTS

| | | | | |
|---|---|---|---|---|
| 5,920,668 A * | 7/1999 | Uehara | ............... | H01S 3/06704 385/27 |
| 6,275,639 B1 * | 8/2001 | Bolt | ..................... | G02B 6/4442 385/134 |
| 9,281,636 B1 * | 3/2016 | Schmitt | .............. | H01R 13/7172 |
| 9,590,737 B2 * | 3/2017 | Tang | .................... | G02B 6/4246 |
| 9,711,929 B1 * | 7/2017 | Kim | ..................... | G02B 6/4246 |
| 9,871,590 B2 * | 1/2018 | Matsui | ................ | G02B 6/3812 |
| 9,876,576 B2 * | 1/2018 | Ho | ........................ | G02B 6/4245 |
| 9,891,395 B2 * | 2/2018 | Lin | ..................... | H04B 10/506 |
| 10,219,412 B1 * | 2/2019 | Betz | ................... | G02B 6/4246 |
| 10,241,283 B1 * | 3/2019 | Shen | .................. | H04B 10/2589 |
| 10,247,893 B1 * | 4/2019 | Elkayam | .................. | H02J 1/10 |
| 10,281,672 B1 * | 5/2019 | Mullsteff | ............. | G02B 6/4453 |
| 10,330,868 B2 * | 6/2019 | Li | ........................ | G02B 6/3897 |
| 10,623,101 B1 * | 4/2020 | Morris | .................. | H04B 10/40 |
| 10,795,096 B1 * | 10/2020 | Leigh | .................. | G02B 6/3883 |
| 10,795,105 B1 * | 10/2020 | Li | ......................... | G02B 6/4454 |
| 10,809,480 B1 * | 10/2020 | Cox | ..................... | H04B 10/25 |
| 10,812,193 B2 * | 10/2020 | Matsui | .................. | H04B 10/40 |
| 10,924,187 B2 * | 2/2021 | Ishii | ..................... | H04J 14/04 |
| 10,938,482 B2 * | 3/2021 | Ishii | ..................... | H04B 10/801 |
| 10,950,997 B2 * | 3/2021 | Dambach | ............ | H01R 13/6275 |
| 11,201,422 B2 * | 12/2021 | Lu | ....................... | H01R 13/6658 |
| 11,204,476 B2 * | 12/2021 | Mainardi | ................ | G02B 6/444 |
| 11,226,458 B2 * | 1/2022 | Minota | ................ | G02B 6/4256 |
| 11,314,025 B2 * | 4/2022 | Matsui | ................. | G02B 6/4246 |
| 11,320,598 B2 * | 5/2022 | Lin | ..................... | G02B 6/3502 |

(Continued)

*Primary Examiner* — Agustin Bello
(74) *Attorney, Agent, or Firm* — PEARL COHEN ZEDEK LATZER BARATZ LLP

(57) ABSTRACT

A device may include a frame, an optical connector coupled to an external surface of the frame, and an optical fiber comprising a bent section positioned external to an interior of the frame and connected to the optical connector.

18 Claims, 7 Drawing Sheets

(56) References Cited

U.S. PATENT DOCUMENTS

| | | | | |
|---|---|---|---|---|
| 11,320,609 B2* | 5/2022 | Li | | G02B 6/428 |
| 11,454,771 B2* | 9/2022 | Mizuno | | G02B 6/4277 |
| 11,573,385 B1* | 2/2023 | Zanetti | | H01R 31/02 |
| 11,609,390 B2* | 3/2023 | Khazen | | G02B 6/3825 |
| 11,619,789 B2* | 4/2023 | Chen | | G02B 6/4292 |
| | | | | 385/88 |
| 2010/0202736 A1* | 8/2010 | Roth | | G02B 6/3823 |
| | | | | 385/59 |
| 2011/0103797 A1* | 5/2011 | Oki | | G02B 6/4292 |
| | | | | 398/79 |
| 2013/0308904 A1* | 11/2013 | McGinnis | | G02B 6/12026 |
| | | | | 385/37 |
| 2015/0104177 A1* | 4/2015 | Kato | | H04B 10/40 |
| | | | | 398/79 |
| 2015/0110136 A1* | 4/2015 | Schusslbauer | | H01S 3/025 |
| | | | | 372/6 |
| 2015/0370021 A1* | 12/2015 | Chan | | G02B 6/4292 |
| | | | | 385/89 |
| 2016/0047998 A1* | 2/2016 | Amirkiai | | G02B 6/3874 |
| | | | | 385/14 |
| 2016/0216466 A1 | 7/2016 | Tang | | G02B 6/4292 |
| 2017/0133777 A1 | 5/2017 | Little | | H01R 12/721 |
| 2018/0275356 A1* | 9/2018 | Li | | G02B 6/443 |
| 2018/0348446 A1* | 12/2018 | Li | | G02B 6/3897 |
| 2018/0372978 A1* | 12/2018 | Wentworth | | G02B 6/4455 |
| 2019/0018206 A1* | 1/2019 | Luo | | G02B 6/43 |
| 2019/0036316 A1* | 1/2019 | Van Baelen | | G02B 6/445 |
| 2019/0157810 A1* | 5/2019 | Little | | H01R 12/75 |
| 2019/0170961 A1* | 6/2019 | Coenegracht | | G02B 6/4444 |
| 2019/0190607 A1* | 6/2019 | Chou | | H05K 1/117 |
| 2019/0219786 A1* | 7/2019 | Crawford | | G02B 6/4453 |
| 2019/0265428 A1* | 8/2019 | Sedor | | G02B 6/3889 |
| 2019/0271812 A1* | 9/2019 | Bretz | | G02B 6/3817 |
| 2019/0278040 A1* | 9/2019 | Geens | | G02B 6/3825 |
| 2019/0293884 A1* | 9/2019 | Little | | G02B 6/3897 |
| 2019/0302367 A1* | 10/2019 | Van Baelen | | G02B 6/4471 |
| 2019/0331871 A1* | 10/2019 | Van Baelen | | G02B 6/4439 |
| 2019/0334648 A1* | 10/2019 | Li | | G02B 6/4215 |
| 2019/0353854 A1* | 11/2019 | Radelet | | G02B 6/4453 |
| 2020/0081208 A1* | 3/2020 | Leigh | | G02B 6/421 |
| 2020/0103608 A1* | 4/2020 | Hill | | G02B 6/4444 |
| 2020/0116590 A1* | 4/2020 | Simard | | H04B 10/071 |
| 2020/0158963 A1* | 5/2020 | Leigh | | G02B 6/4453 |
| 2020/0249412 A1* | 8/2020 | Marcouiller | | G02B 6/3608 |
| 2020/0264392 A1* | 8/2020 | Li | | G02B 6/4403 |
| 2020/0271882 A1* | 8/2020 | Geens | | G02B 6/4452 |
| 2020/0278504 A1* | 9/2020 | Chang | | G02B 6/38875 |
| 2020/0288589 A1* | 9/2020 | Lavoie | | H05K 7/20163 |
| 2020/0301078 A1* | 9/2020 | Montena | | G02B 6/3825 |
| 2020/0341218 A1* | 10/2020 | Leclair | | G06F 1/189 |
| 2020/0371300 A1* | 11/2020 | Sashida | | G02B 6/3879 |
| 2021/0018709 A1* | 1/2021 | Berdan | | G02B 6/4452 |
| 2021/0036780 A1* | 2/2021 | Kuo | | G02B 6/4284 |
| 2021/0044356 A1* | 2/2021 | Aboagye | | G02B 6/4256 |
| 2021/0116649 A1* | 4/2021 | Tamekuni | | G02B 6/40 |
| 2021/0132311 A1* | 5/2021 | Shearman | | G02B 6/4261 |
| 2021/0141167 A1* | 5/2021 | Wong | | G02B 6/3825 |
| 2021/0141182 A1* | 5/2021 | Ward | | G02B 6/4453 |
| 2021/0141185 A1* | 5/2021 | Geens | | G02B 6/3891 |
| 2021/0149132 A1* | 5/2021 | Li | | G02B 6/4215 |
| 2021/0157058 A1* | 5/2021 | Lin | | G02B 6/4246 |
| 2021/0165174 A1* | 6/2021 | Minota | | G02B 6/4256 |
| 2021/0181443 A1* | 6/2021 | Zhou | | G02B 6/3825 |
| 2021/0191059 A1* | 6/2021 | Bolster | | G02B 6/4471 |
| 2021/0223482 A1* | 7/2021 | Zanetti | | H01R 24/60 |
| 2021/0263247 A1* | 8/2021 | Bechtolsheim | | G02B 6/4284 |
| 2021/0263253 A1* | 8/2021 | Granullaque Diaz | | |
| | | | | G02B 6/4472 |
| 2021/0271043 A1* | 9/2021 | Geens | | G02B 6/3897 |
| 2021/0278313 A1* | 9/2021 | Simard | | G02B 6/3897 |
| 2021/0286142 A1* | 9/2021 | Leigh | | G02B 6/3822 |
| 2021/0311279 A1* | 10/2021 | Diepstraten | | G02B 6/4471 |
| 2021/0333477 A1* | 10/2021 | Ott | | G02B 6/3825 |
| 2021/0341699 A1* | 11/2021 | Bishop | | G02B 6/3897 |
| 2021/0349274 A1* | 11/2021 | Sun | | G02B 6/4446 |
| 2021/0356681 A1* | 11/2021 | Takeuchi | | G02B 6/02052 |
| 2021/0373271 A1* | 12/2021 | Geens | | G02B 6/3894 |
| 2021/0392300 A1* | 12/2021 | Tong | | G02B 6/4292 |
| 2021/0392301 A1* | 12/2021 | Tong | | H04N 21/615 |
| 2022/0043223 A1* | 2/2022 | Leigh | | G02B 6/4219 |
| 2022/0057585 A1* | 2/2022 | Hendrix | | G02B 6/3897 |
| 2022/0066107 A1* | 3/2022 | Leigh | | G02B 6/3825 |
| 2022/0066115 A1* | 3/2022 | Cooke | | G02B 6/4455 |
| 2022/0082776 A1* | 3/2022 | Sedor | | G02B 6/4452 |
| 2022/0120989 A1* | 4/2022 | Takeuchi | | G02B 6/4471 |
| 2022/0137315 A1* | 5/2022 | Vaswani | | G02B 6/4478 |
| | | | | 385/135 |
| 2022/0196953 A1* | 6/2022 | Gutierrez | | G02B 6/4446 |
| 2022/0221669 A1* | 7/2022 | de Jong | | G02B 6/3897 |
| 2022/0229254 A1* | 7/2022 | Sievers | | G02B 6/3825 |
| 2022/0236477 A1* | 7/2022 | Bovington | | G02B 6/3863 |
| 2022/0244471 A1* | 8/2022 | Khazen | | G02B 6/406 |
| 2022/0244472 A1* | 8/2022 | Goergen | | G02B 6/4256 |
| 2022/0255627 A1* | 8/2022 | Wang | | G02B 6/4246 |
| 2022/0260794 A1* | 8/2022 | Tang | | G02B 6/4246 |
| 2022/0260799 A1* | 8/2022 | Van Baelen | | G02B 6/4455 |
| 2022/0276456 A1* | 9/2022 | Bishop | | G02B 6/4446 |
| 2022/0283360 A1* | 9/2022 | Nagarajan | | G02B 6/4261 |
| 2022/0368424 A1* | 11/2022 | Zanetti | | H04B 10/40 |
| 2022/0404561 A1* | 12/2022 | Rathinasamy | | G02B 6/3897 |
| 2023/0008823 A1* | 1/2023 | Milette | | G02B 6/4453 |
| 2023/0034045 A1* | 2/2023 | Chen | | H01R 13/502 |
| 2023/0099201 A1* | 3/2023 | Takano | | G02B 6/406 |
| | | | | 385/89 |
| 2023/0116032 A1* | 4/2023 | Claessens | | G02B 6/4453 |
| | | | | 385/135 |

* cited by examiner

Section AA

Detail C
Section BB

Detail E
Section DD

NETWORK INTERFACE DEVICE WITH EXTERNAL OPTICAL CONNECTOR

FIELD OF THE INVENTION

The present invention relates to the field of network interface devices, and more particularly, to network interface devices having optical connectors.

BACKGROUND OF THE INVENTION

Typically, electrical and optical connectors of a network interface device (e.g., such as form-factor pluggable device) are positioned at a distal end of the device, the end that is intended to be inserted into a receptacle at a data communication system. Mating electrical and optical ports of the data communication system are typically positioned deep inside the receptacle, far from a receptacle opening on a front panel of the data communication system. Such position of the optical port may, for example, create difficulties in maintenance (e.g., cleaning) of the optical port. Also, a network interface device with both electrical and optical connectors positioned at the distal end of the device typically has relatively large footprint and occupies relatively large space on a printed circuit board (e.g., motherboard) of the data communication system.

SUMMARY OF THE INVENTION

Embodiments of the invention may provide a device, which may include a frame, an optical connector coupled to an external surface of the frame, and an optical fiber connected to the optical connector, the optical fiber may include a bent section positioned external to an interior of the frame. The device may include an electrical connector positioned at an end of the frame. The optical connector may be offset with respect to the electrical connector in a longitudinal direction of the frame. The device may include a cover coupled to the frame and accommodating at least a portion of the bent section of the optical fiber. The cover may be optically sealed with respect to the frame.

Embodiments of the invention may provide a form factor device which may include a frame having a first end and a second end, a first (e.g., electrical) connector positioned at the first end of the frame, and a second (e.g., optical) connector coupled to an external surface of the frame, the second connector being offset from the first end towards the second end of the frame in a longitudinal direction. The form factor device may include an optical fiber connected to the second connector, the optical fiber may include a curved section positioned external to an interior of the frame. The form factor device may include a shell coupled to the frame and accommodating at least a portion of the curved section of the optical fiber. The shell may be optically sealed with respect to the frame.

Embodiment of the invention may provide a data communication system, the system may include: a form factor device including: a frame having a first end and a second end; a first (e.g., electrical) connector positioned at the first end of the frame; and a second (e.g., optical) connector coupled to an external surface of the frame; and a network switch device including a front panel, the front panel may include: a first receptacle opening to receive the electrical connector of the form factor; and a second receptacle opening to receive the optical connector of the form factor. The network switch device may include: a printed circuit board (PCB) placed behind the front panel, a first receptacle placed on the PCB, the first receptacle to receive the first connector of the form factor device; and a second receptacle placed on the PCB with respect to the first receptacle, the second receptacle to receive the second connector of the form factor device. The first receptacle and the second receptacle may be placed, for example, on opposing sides of the PCB with respect to each other.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
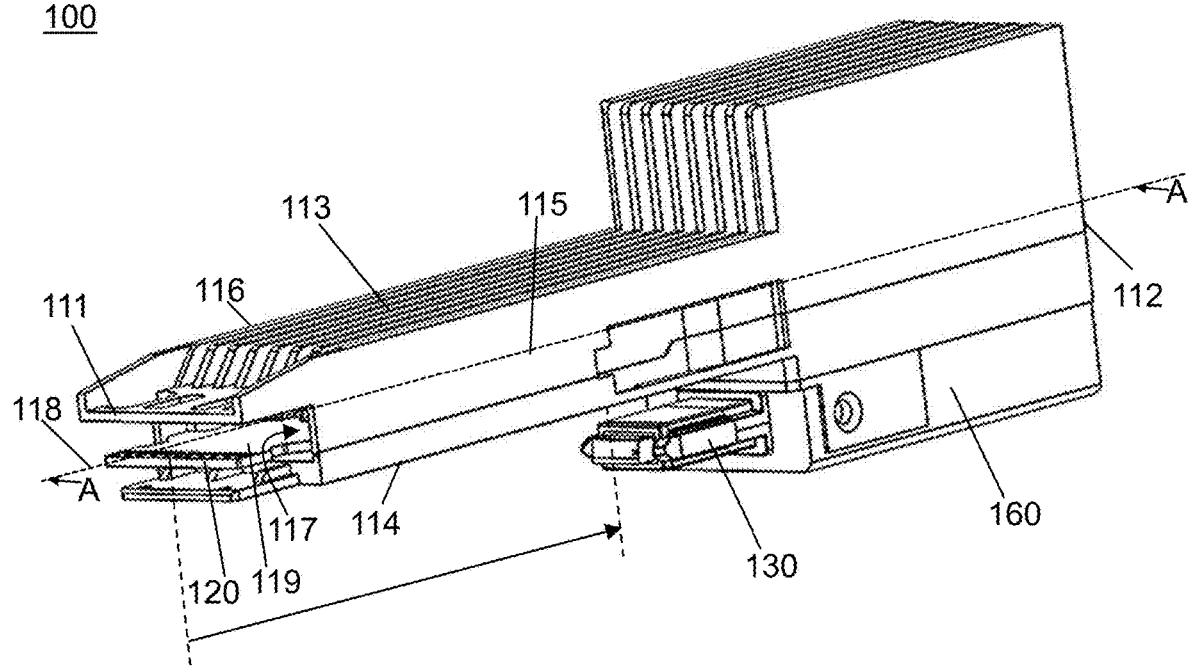
FIGS. 1A, 1B, 1C and 1D are three-dimensional (3D) diagrams of a network interface device including a frame and an external optical connector coupled to a bottom surface of the frame, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Figure 1B:
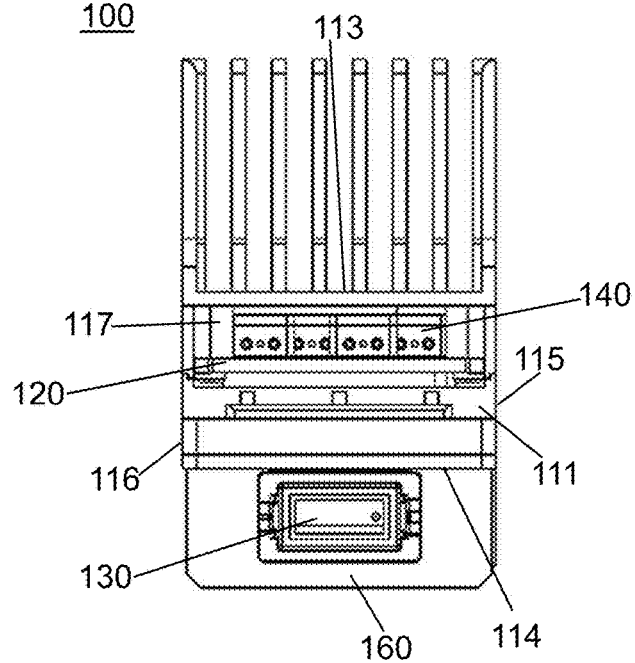
Figure 1C:
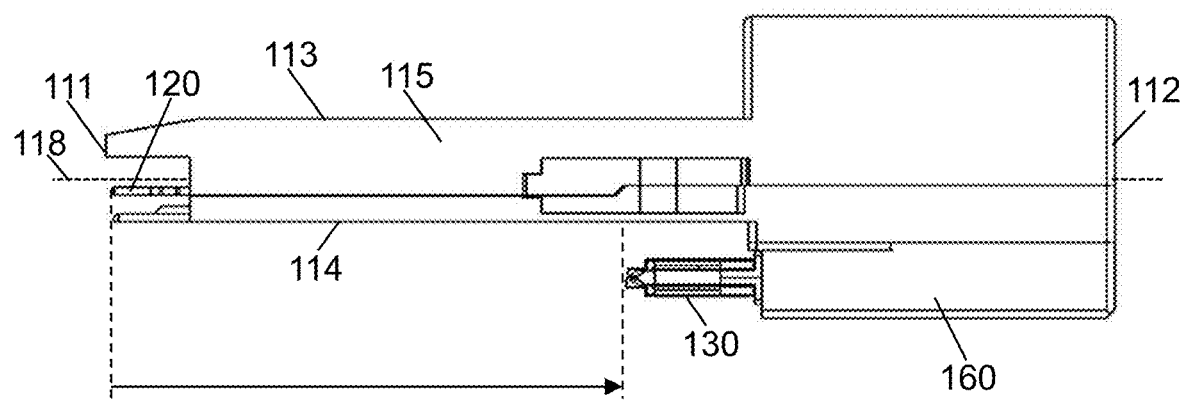
Figure 1D:
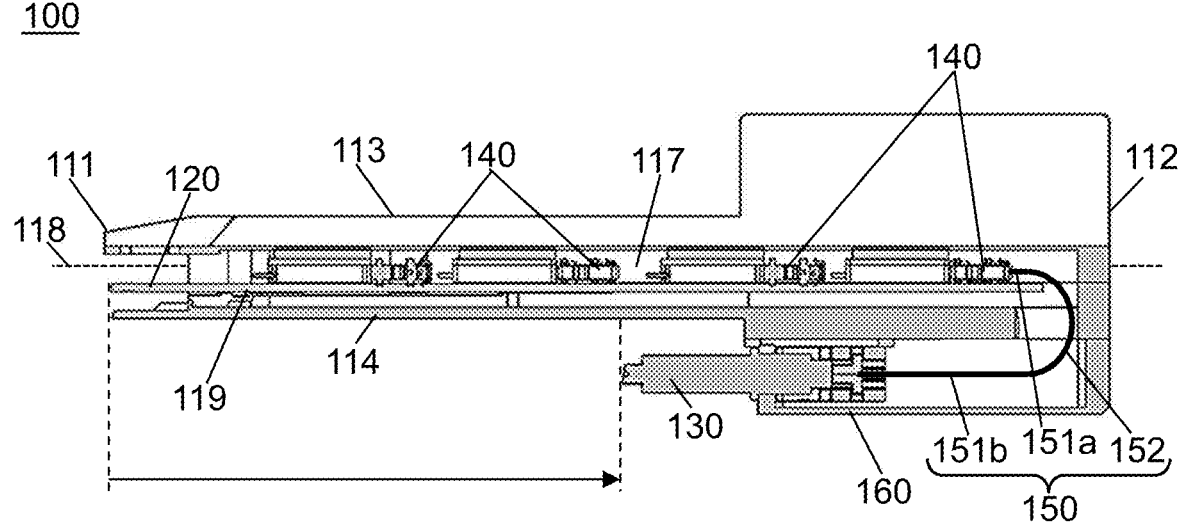

Reference is now made to FIGS. 1A, 1B, 1C and 1D, which are three-dimensional (3D) diagrams of a network interface device 100 including a frame 110 and an external optical connector 130 coupled to a bottom surface 114 of frame 110, according to some embodiments of the invention. FIG. 1A shows a perspective view of network interface device 100. FIG. 1B shows a front view of network interface device 100. FIG. 1C shows a side view of network interface device 100. FIG. 1D shows a partial section view of network interface device 100 along line AA of FIG. 1A.

Figure 2:
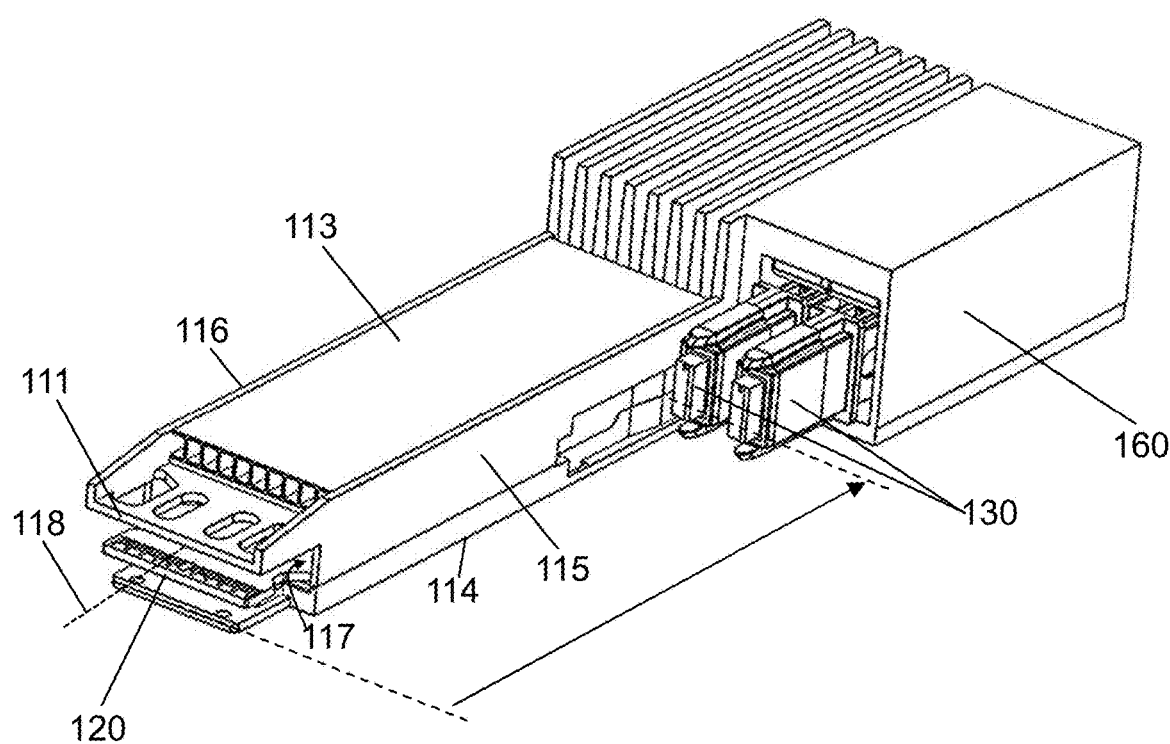
FIG. 2 is a 3D diagram of the network interface device including two external optical connectors coupled to a lateral surface of the frame, according to some embodiments of the invention.

Reference is also made to FIG. 2, which is a 3D diagram of network interface device 100 including two external optical connectors 130 coupled to a lateral surface 115 of frame 110, according to some embodiments of the invention. FIG. 2 shows a perspective view of network interface device 100.

Network interface device 100 may be, for example, a pluggable network interface device, such as, e.g., a small form-factor pluggable (SFP) device (e.g., a quad SFP (QSFP) device or an octal SFP (OSFP) device) or any other form-factor device known in the art. Network interface device 100 may include electronic components such as connectors, chips, lasers or any other components known in the art. Network interface device 100 may be used to transfer signals in telecommunication and/or data communication systems.

Network interface device 100 may include a frame 110. Frame 110 may include a first end 111, a second end 112, a top surface 113, a bottom surface 114, a first lateral surface 115 and a second lateral surface 116. In some embodiments, frame 110 may have a rectangular (or substantially rectangular) shape. For example, top surface 113 and bottom surface 114 of frame 110 may be parallel (or substantially parallel) to each other and/or first lateral surface 115 and second lateral surface 116 of frame 110 may be parallel (or substantially parallel) to each other and perpendicular to top surface 113 and bottom surface 114 of frame 110. Frame 110 may include a hollow (or substantially hollow) interior 117. Frame 110 may include a central longitudinal axis 118 extending between first end 111 and second end 112 of frame 110.

Network interface device 100 may include a printed circuit board (PCB) 119. PCB may be at least partly positioned within interior 117 of frame 110.

Network interface device 100 may include a first (e.g., electrical) connector 120. First connector 120 may be positioned at first end 111 of frame 110. First connector 120 may be, for example, a male connector (e.g., having one or more exposed, unshielded electrical terminals), which may be inserted into a receptacle, e.g., such as receptacle 224 as described hereinbelow with respect to FIGS. 3A-3B and 4A-4B. First connector 120 may be positioned at the edge of PCB 119 that protrudes external to interior 117 of frame 110 through first end 111 of frame 110.

Network interface device 100 may include a second (e.g., optical) connector 130. Second connector 130 may be coupled to an external surface of frame 110. For example, second connector 130 may be coupled to bottom surface 114 of frame 110 (e.g., as shown in FIGS. 1A-1D). In another example, second connector 130 may be coupled to one of lateral surfaces 115, 116 of frame 110, e.g., to first lateral surface 115 of frame 110 as shown in FIG. 2. Second connector 130 may be offset from (e.g., distanced from) first end 111 of frame 110 and positioned some distance towards second end 112 of frame 110 in a longitudinal direction (e.g., in a direction parallel to central longitudinal axis 118 of frame 110). For example, second connector 130 may be distanced by 0-7 cm from first end 111 of frame 110 such that second connector 130 is positioned at 3.5-9 cm from second end 112 of frame 110. Second connector 130 may be, for example, a male connector which may be inserted inside a receptacle, e.g., such as receptacle 226 as described hereinbelow with respect to FIGS. 3A-3B and 4A-4B. In some embodiments, network interface device 100 may include two or more second connectors 130. For example, FIG. 2 shows network interface device 100 having two second connectors 130.

Network interface device 100 may include lasers 140 (e.g., as shown in FIG. 1D). Lasers 140 may be positioned within interior 117 of frame 110. Lasers 140 may be placed on PCB 119. Network interface device 100 may include an optical fiber 150 (e.g., as shown in FIG. 1D). Optical fiber 150 may be connected at its first end to one of lasers 140 and may be connected at its second end to second (e.g., optical) connector 130. Optical fiber 150 may exit from interior 117 of frame 110. Optical fiber 150 may include one or more straight (or substantially straight) longitudinal sections, for example a first straight longitudinal section 151a (e.g., positioned within interior 117 of frame 110) and a second straight longitudinal section 151b (e.g., positioned external to interior 117 of frame 110) as shown in FIG. 1D. Straight longitudinal sections 151a, 151b of optical fiber 150 may be parallel (or substantially parallel) to PCB 119 and/or to central longitudinal axis 118 of frame 110. Optical fiber 150 may include a curved (e.g., bent) longitudinal section 152 (e.g., as shown in FIG. 1D). Bent or curved longitudinal section 152 may be, for example, positioned between straight longitudinal sections 151a, 151b of optical fiber 150. However, different spatial arrangements of optical fiber 150 are possible. All, or at least a portion of bent or curved longitudinal section 152 of optical fiber 150 may be positioned external to interior 117 of frame 110 (e.g., as shown in FIG. 1D). Optical fiber 150 may be connected at its second end to second (e.g., optical) connector 130 (e.g., as shown in FIG. 1D). While single optical fiber 150 is shown in FIGS. 1D, network interface device 100 may include a plurality of optical fibers 150, wherein each of optical fibers 150 may be connected to at least one of lasers 140.

In operation, a portion of light emitted from laser 140 and propagating through optical fiber 150 may escape from curved longitudinal section 152 of optical fiber 150. Network interface device 100 may include a shell (e.g., cover) 160 that may be coupled to frame 110 and may accommodate at least a portion of curved longitudinal section 152 of optical fiber 150 (e.g., as shown in FIG. 1D). In some embodiments, shell 160 may be optically sealed with respect to frame 110. In some embodiments, shell 160 may be an integral portion of frame 110. Shell 160 may prevent light from escaping external to shell 160.

Figure 3A:
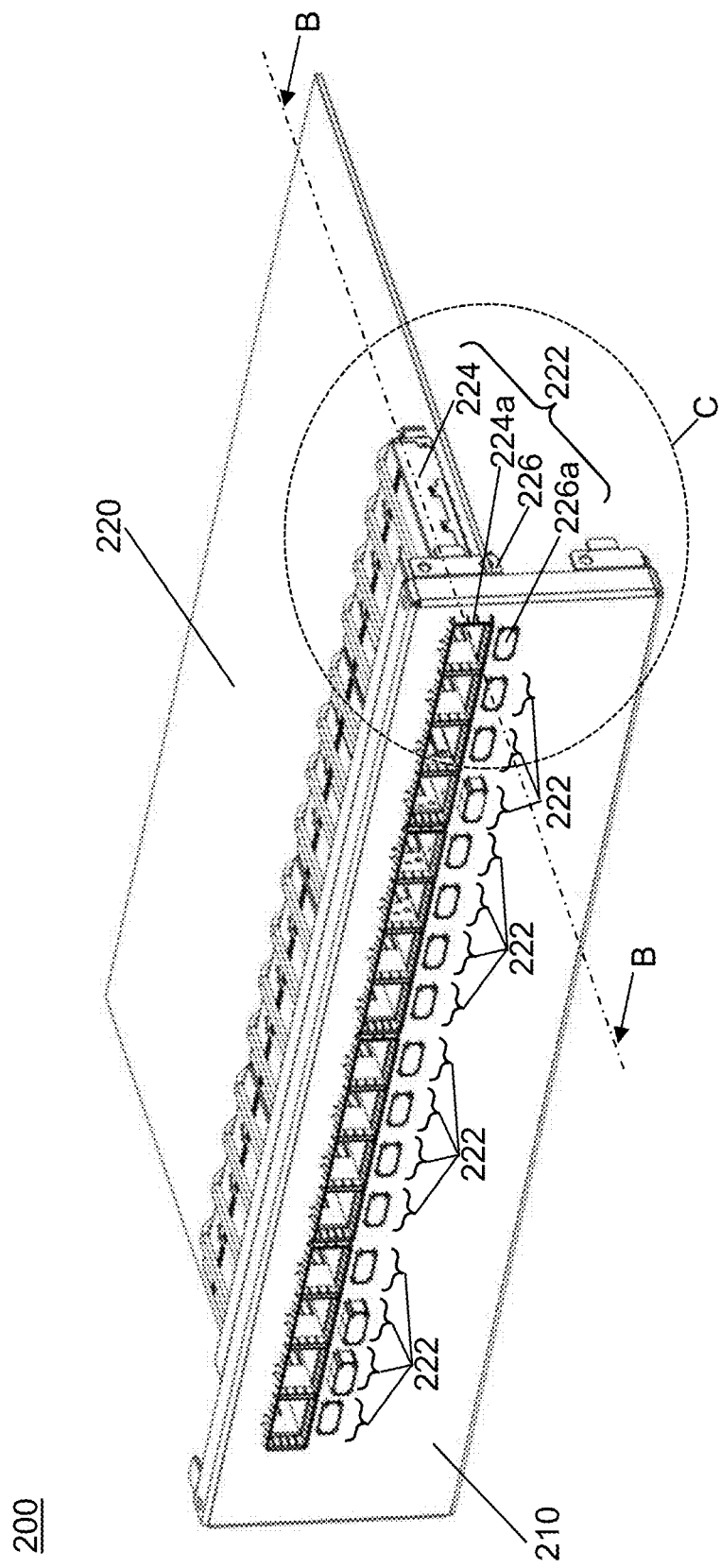
FIGS. 3A and 3B are 3D diagrams of a network switch device, according to some embodiments of the invention.
Figure 3B:
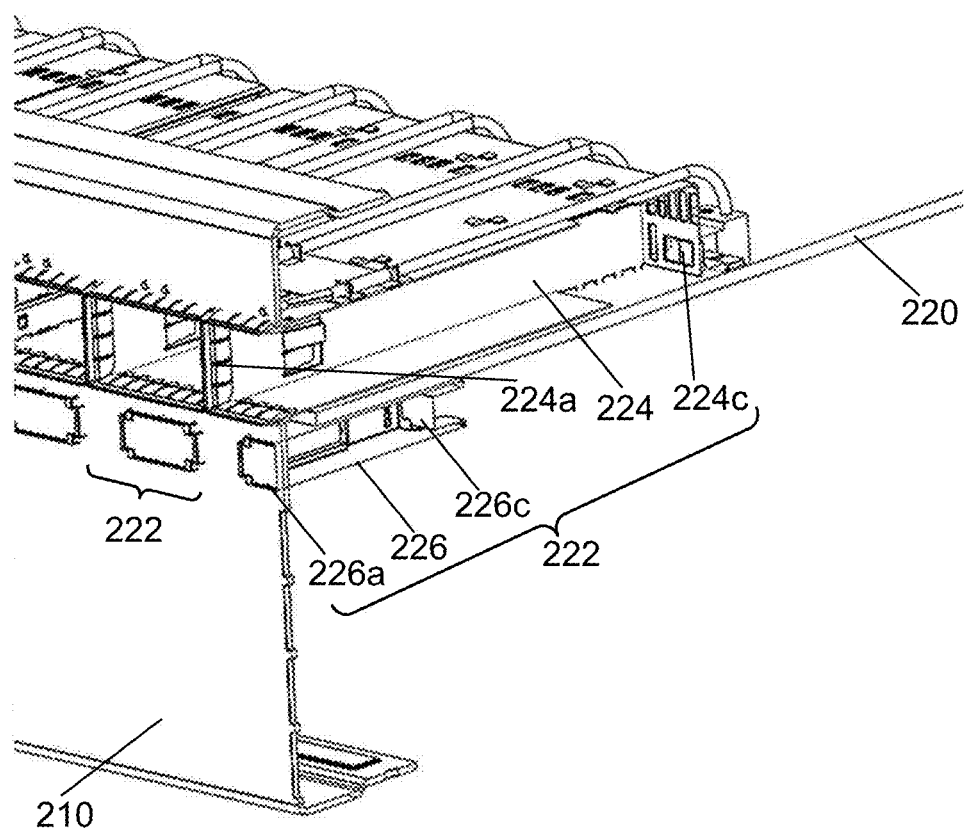

Reference is now made to FIGS. 3A and 3B, which are 3D diagrams of a network switch device 200, according to some embodiments of the invention. FIG. 3A shows a perspective view of network switch device 200. FIG. 3B shows an enlarged partial section view C of network switch device 200 along line BB of FIG. 3A.

Figure 4A:
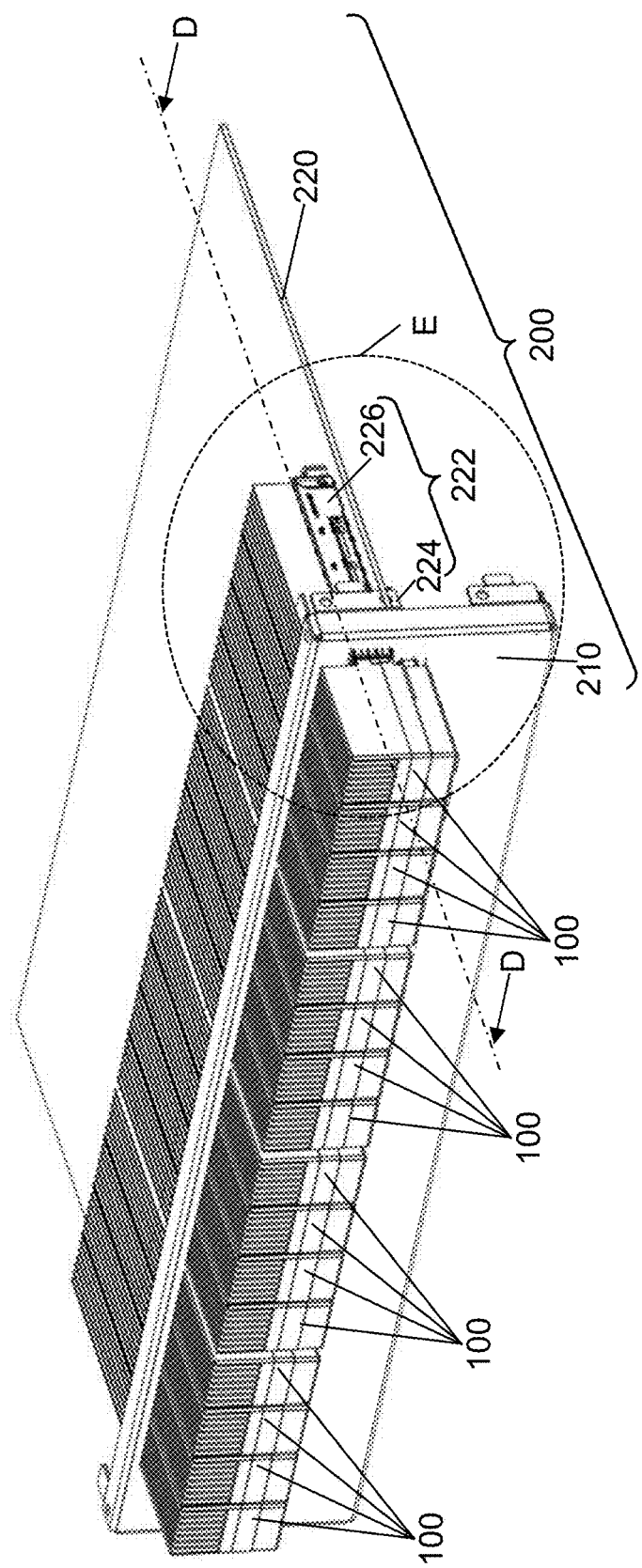
FIGS. 4A and 4B are 3D diagrams of a data communication system including the network switch device and a plurality of the network interface devices, according to some embodiments of the invention.
Figure 4B:
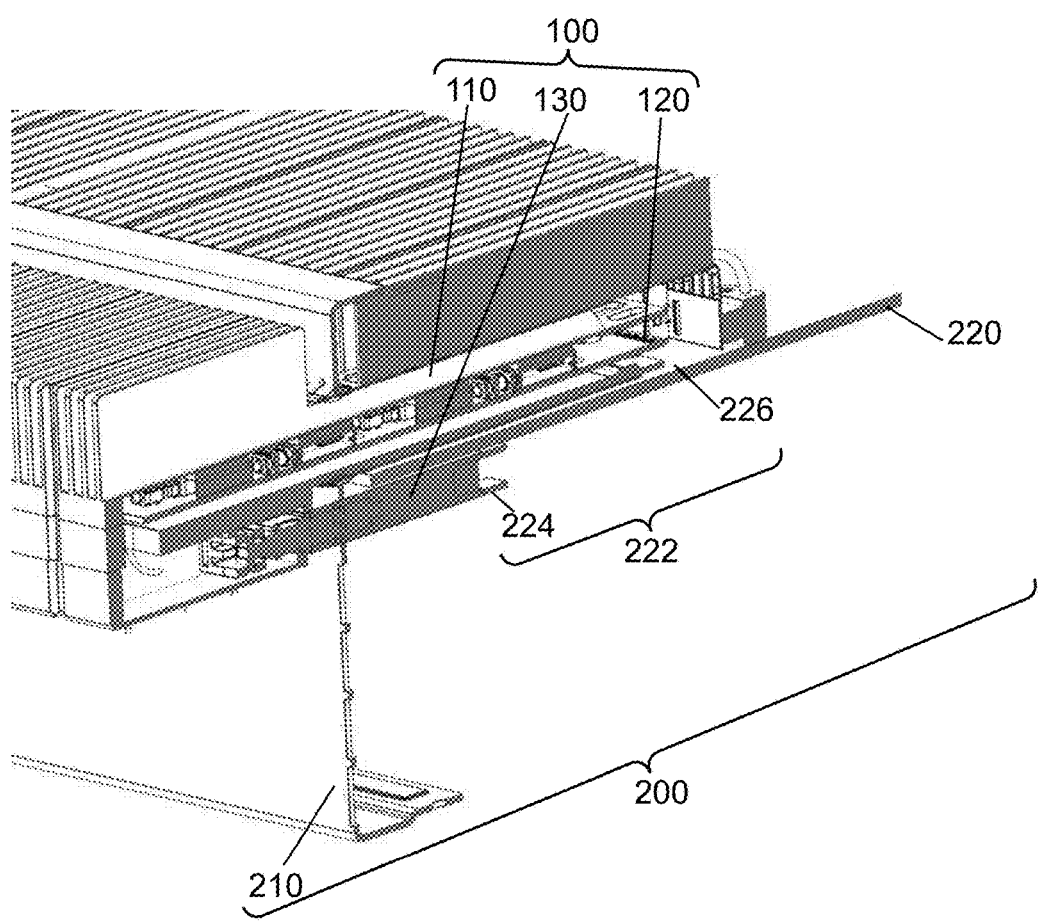

Reference is also made to FIGS. 4A and 4B, which are 3D diagrams of a data communication system 300 including network switch device 200 and a plurality of network interface devices 100, according to some embodiments of the invention. FIG. 4A shows a perspective view of data communication system 300. FIG. 4B shows an enlarged partial section view E of data communication system 300 along line D-D of FIG. 4A.

Network switch device 200 may include a front panel 210 and a printed circuit board (PCB) 220 positioned behind front panel 210 (e.g., as shown in FIGS. 3A and 3B). PCB 220 may be or may include a motherboard of network switch device 200. PCB 220 may include a plurality of pairs 222 of receptacles. Each pair 222 of receptacles may include: (i) a first receptacle 224 having a first receptacle opening 224a on front panel 210, and (ii) a second receptacle 226 having a second receptacle opening 226a on front panel 210 of network switch device 200 (e.g., as shown in FIGS. 3A and 3B).

Each pair 222 of receptacles may receive first and second connectors 120, 130 of network interface device 100. For example, first receptacle 224 of each pair 222 may receive frame 110 with first (e.g., electrical) connector 120 positioned at the end of frame 110, and second receptacle 226 of the respective pair may receive second (e.g., optical) connector 130 coupled to the external surface of frame 110 of network interface device 100 (e.g., as shown in FIGS. 4A and 4B). First receptacle 224 may include a first (e.g., electrical) port 224c to connect first (e.g., electrical) connector 120 of network interface device 100, and second receptacle 226 may include a second (e.g., optical) port 226c to connect second (e.g., optical) connector 130 of network interface device 100 (e.g., as shown in FIG. 3B).

First receptacle 224 and second receptacle 226 of each pair 222 of receptacles may be positioned on opposing sides of PCB 220 with respect to each other, for example as shown in FIGS. 3A-3B and 4A-4B. In another example, if second (e.g., optical) connector 130 of network interface device 100 is coupled to the external side surface of frame 110 of network interface device 100 (e.g., as described above with respect to FIG. 2), both first receptacle 224 and second receptacle 226 of each pair 222 of receptacles may be positioned at the same side of PCB 220 and adjacent to each other (not shown).

Advantageously, optical ports 226c of network switch device 200, compatible with the inventive network interface device 100, are positioned closer to front panel 210 of network switch device 200 as compared to optical ports of typical prior art switch device which are typically positioned at the same location as electrical ports of the switch device far from the receptacle opening at the front panel of the switch device. Accordingly, optical ports 226c of network switch device 200 may be easily accessed via their respective receptacle openings 226a on front panel 210 of network switch device 200, e.g., for maintenance (e.g., cleaning) purposes.

Even though network interface device 100 has external optical connector 130, network interface device 100 meets safety requirements known in the art. For example, lasers 140 of network interface device 100 may operate only when electrical connector 120 is connected to its respective electrical port 224c in network switch device 200, which is possible only if both frame 110 and external optical connector 130 of network interface device 100 are positioned within their respective receptacles 224, 226 in network switch device 200. If network interface device 100 is unplugged from network switch device 200, electrical connector 120 is disconnected from its respective electrical port 224c in network switch device 200 and operation of lasers 140 is terminated. Accordingly, optical connector 130 of network interface device 100 is not operative if network interface device 100 is unplugged from network switch device 200. In operation, light emitted from lasers 140 and propagating through optical fiber 150 may escape from curved longitudinal section 152 of optical fiber 150 of network interface device 100. However, shell 160 covering curved longitudinal section 152 of optical fiber 150 may prevent light from escaping external to network interface device 100. Therefore, network interface device 100 meets safety requirements known in the art.

Network interface device 100 with external optical connector 130 occupies less space on PCB 220 of network switch device 200 as compared to typical prior art network interface device. Accordingly, network interface device 100 provides more flexibility in designing PCB 220 of network switch device 200 as compared to typical prior art network interface device.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:
1. A device comprising:
a frame comprising an external bottom surface, the external bottom surface facing a printed circuit board (PCB) when the frame is inserted into a receptacle placed on the PCB;
an optical connector coupled to the external bottom surface of the frame, the optical connector being disposed below the external bottom surface of the frame; and an optical fiber connected to the optical connector, the optical fiber comprising a bent section positioned external to an interior of the frame.

2. The device of claim 1, comprising an electrical connector positioned at an end of the frame.

3. The device of claim 2, wherein the optical connector is offset with respect to the electrical connector in a longitudinal direction of the frame.

4. The device of claim 1, comprising a cover coupled to the frame and accommodating at least a portion of the bent section of the optical fiber.

5. The device of claim 4, wherein the cover is optically sealed with respect to the frame.

6. A form factor device comprising:
   a frame having a first end, a second end and an external bottom surface, the external bottom surface facing a printed circuit board (PCB) when the frame is inserted into a receptacle placed on the PCB;
   a first connector positioned at the first end of the frame;
   a second connector coupled to the external bottom surface of the frame, the second connector being disposed below the external bottom surface of the frame, the second connector being offset from the first end towards the second end of the frame in a longitudinal direction.

7. The form factor device of claim 6, wherein the first connector is an electrical connector.

8. The form factor device of claim 6, wherein the second connector is an optical connector.

9. The form factor device of claim 6, comprising an optical fiber connected to the second connector, the optical fiber comprising a curved section positioned external to an interior of the frame.

10. The form factor device of claim 9, comprising a shell coupled to the frame and accommodating at least a portion of the curved section of the optical fiber.

11. The form factor device of claim 10, wherein the shell is optically sealed with respect to the frame.

12. A data communication system comprising:
   a form factor device comprising:
      a frame having a first end, a second end and an external bottom surface, the external bottom surface facing a printed circuit board (PCB) when the frame is inserted into a receptacle placed on the PCB;
      a first connector positioned at the first end of the frame; and
      a second connector coupled to the external bottom surface of the frame the second connector being disposed below the external bottom surface of the frame; and
   a network switch device comprising:
      a front panel, the front panel comprising:
         a first receptacle opening to receive the first connector of the form factor; and
         a second receptacle opening to receive the second connector of the form factor;
      a printed circuit board (PCB) placed behind the front panel;
      a first receptacle placed on the PCB, the first receptacle to receive the first connector of the form factor device through the first receptacle opening; and
      a second receptacle placed on the PCB on opposing side of the PCB relative to the first receptacle, the second receptacle to receive the second connector of the form factor device.

13. The data communication system of claim 12, wherein the second connector of the form factor device is offset with respect to the first connector of the form factor device in a longitudinal direction of the frame of the form factor device.

14. The data communication system of claim 12, wherein the first connector of the form factor device is an electrical connector.

15. The data communication system of claim 12, wherein the second connector of the form factor device is an optical connector.

16. The data communication system of claim 12, wherein the form factor device comprises an optical fiber and connected to the second connector of the form factor device, the optical fiber comprising a curved section positioned external to an interior of the frame of the form factor device.

17. The data communication system of claim 16, wherein the form factor device comprises a shell coupled to the frame of the form factor device and accommodating at least a portion of the curved section of the optical fiber of the form factor device.

18. The data communication system of claim 17, wherein the shell of the form factor device is optically sealed with respect to the frame of the form factor device.

* * * * *